Jan. 20, 1959   H. F. FOUNTAIN ET AL   2,870,336
METHOD OF AND APPARATUS FOR GAUGING THE DIMENSIONS
OF OBJECTS OF IRREGULAR CONTOUR
Filed Feb. 17, 1955   2 Sheets-Sheet 1
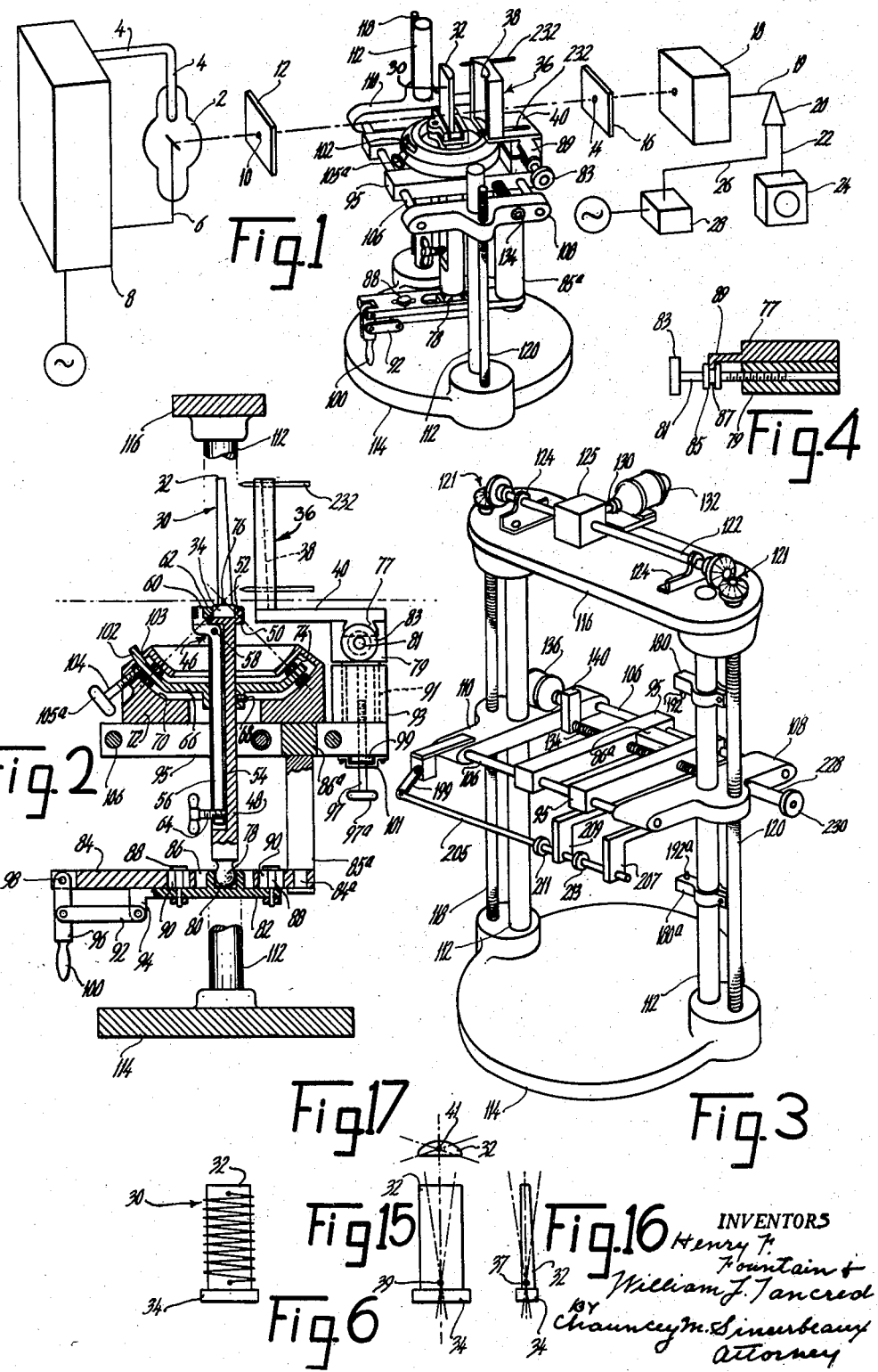

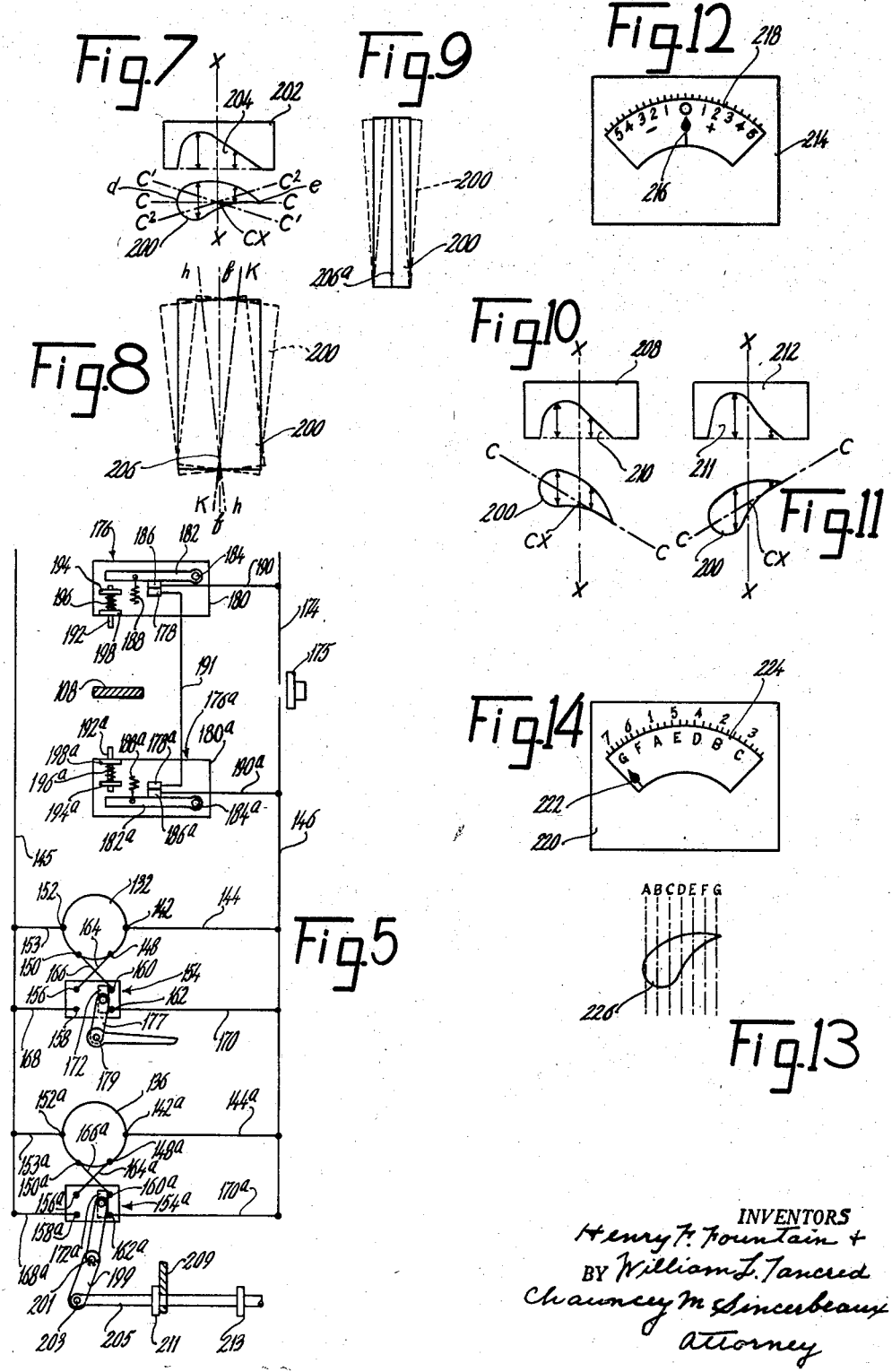

2,870,336
Patented Jan. 20, 1959

2,870,336
METHOD OF AND APPARATUS FOR GAUGING THE DIMENSIONS OF OBJECTS OF IRREGULAR CONTOUR

Henry F. Fountain, Madison, and William L. Tancred, Wethersfield, Conn., assignors to Sturrup, Incorporated, Middletown, Conn., a corporation of Connecticut Application February 17, 1955, Serial No. 488,866

17 Claims. (Cl. 250—53)

This invention relates to a method of and apparatus for gauging the dimensions of objects of irregular cross section or contour.

One object of the invention is to produce a novel and improved apparatus for gauging the dimensions of objects of irregular contour by which a predetermined dimension of an object of irregular contour at any point therein may be accurately gauged with efficiency and dispatch.

Another object of the invention is to provide an apparatus by which pieces of irregular contour may be readily tested to determine whether they conform in a predetermined dimension to the corresponding dimension of a perfect piece.

Another object of the invention is to produce a novel and improved apparatus by which the dimensions of objects or pieces of irregular contour may be accurately gauged by means of penetrating radiations.

Another object of the invention is to produce an improved method of gauging the dimensions of objects of irregular contour and to devise a method by which predetermined dimensions of such objects may be accurately gauged with greater speed and efficiency than can be done by the methods heretofore followed.

With the above and other objects in view, the invention consists in the apparatus for and the method of gauging the dimensions of objects of irregular contour each containing the novel and improved features hereinafter described and particularly pointed out in the claims the advantage of which will be readily understood and appreciated by those skilled in the art.

The invention will be clearly understood from the accompanying drawing illustrating an apparatus embodying certain features of the invention which may be employed in carrying out the present gauging method and the following detailed description of the construction therein shown.

In the drawings,

Fig. 1 is a schematic diagram of an apparatus for transmitting and receiving an X-ray beam employed in gauging the dimensions of an object of irregular contour combined with a perspective illustration of mechanism for supporting the said object and an associated monitor and for moving said object and monitor parts to cause the scanning of the same by the beam.

Fig. 2 is a view partly in front elevation and partly in vertical section illustrating the devices for supporting the object to be gauged and the monitor during a gauging operation.

Fig. 3 is a perspective view illustrating the mechanism for carrying the supporting devices for the object and the monitor shown in Fig. 2 and for imparting certain movements to said devices with relation to the beam to cause the beam to scan the object to be gauged and the monitor.

Fig. 4 is a detail view in vertical section illustrating certain parts of the devices for supporting the monitor in position for the scanning operation and for adjusting the position of the monitor.

Fig. 5 is a diagrammatic view showing the electrical circuits for operating the vertically and horizontally movable carriages of the mechanism for moving the object to be gauged and the monitor during the scanning operation and the controlling devices for said circuits.

Fig. 6 is a view in front elevation of the object of irregular contour to be gauged shown in Figs. 1 and 2 with the scanning pattern laid out thereon.

Fig. 7 is a plan view illustrating a piece of irregular contour and a monitor for said piece set up in relative positions for the gauging of the thickness of said piece by a beam of penetrating radiations in accordance with the present method and illustrating diagrammatically the manner in which the said piece may be adjusted about a vertical axis in the present apparatus.

Fig. 8 is a view in front elevation of the piece shown in Fig. 7 and illustrating diagrammatically the manner in which the piece may be adjusted about a horizontal axis in the present apparatus.

Fig. 9 is a view in side elevation of the piece shown in Fig. 7 and illustrating diagrammatically the manner in which the piece may be adjusted about another horizontal axis in the present apparatus.

Fig. 10 is a plan view illustrating the piece of irregular contour shown in Fig. 7 and a monitor for said piece set up in relative positions for the gauging of dimensions other than thickness.

Fig. 11 is a plan view illustrating the piece of irregular contour shown in Figs. 7 to 10 inclusive and a monitor for said piece set up in relative positions for the gauging of still other dimensions other than thickness.

Fig. 12 is a view in front elevation of a zero reading recorder which may be used as a part of the present apparatus in gauging the dimensions of objects of irrgeular contour.

Fig. 13 is a view showing a piece to be gauged in its dimensions other than thickness and illustrating diagrammatically the manner in which step readings may be taken on the present apparatus to compare the readings with corresponding readings taken from a perfect piece.

Fig. 14 is a view in front elevation of a galvanometer which may advantageously be used as a part of the present apparatus in taking step readings of a master piece and step readings of a piece to be gauged, and Figs. 15, 16 and 17 are, respectively, a view in front elevation, a view in side elevation, and a plan view of the object of irregular contour to be gauged with with certain diagrammatical lines and points thereon.

The apparatus diagrammatically shown in Fig. 1 comprises an X ray source indicated at 2 which is connected by conductors 4 and 6 with an X-ray power supply mechanism indicated at 8. A beam of radiation from said source is transmitted through a relatively narrow opening 10 in a screen 12 thence through a relatively narrow opening 14 in a screen 16 and the beam after emerging from the screen 16 impinges upon an X-ray sensitive electronic detector 18. The rays issue from the screen 12 in a very narrow beam of closely adjacent rays and this condition of the beam is maintained by the screen 16. The detector may be one of the well known detecting devices producing an electric current signal in response to variations in the intensity of the impinging X-ray.

The beam is indicated diagrammatically in the drawings by the dot-and-dash line $x$—$x$ and this line may be hereinafter referred to as the beam or the line of the beam. The devices for projecting the X-ray beam $x$—$x$ are preferably constructed and arranged to project and direct the beam in a horizontal direction.

The detector is shown as connected by a conductor 19 with an amplifier 20 and the amplifier is connected by a conductor 22 with an indicator or recorder 24. The amplifier is connected by a conductor 26 with a power supply amplifier 28.

The device or piece to be gauged is placed in the apparatus in a position for the passage of the X-ray beam through the same in the direction in which the dimension thereof is to be measured. Associated with the piece in the gauging operation is a monitor a predetermined dimension of which has a definite relation to a predetermined dimension of the piece. The monitor is placed in a predetermined relation to the piece under test for the passage of the X-ray beam emerging from the piece through the monitor in a predetermined direction with relation thereto.

The monitor has a special formation for the particular form or contour of the piece the dimensions of which are to be gauged. The monitor is so formed that when it is placed in a predetermined opposed position with relation to the piece under test in a predetermined direction the dimension of the monitor, or at least a portion thereof, at each point in said direction added to the dimension in said direction of the piece at each opposed point in said direction will always equal a constant sum, if the piece is a perfect piece. The points on the monitor and the points on the piece which are or may be placed in opposed relation in a predetermined direction by the placing of the monitor in said predetermined opposed position with relation to the piece in said direction are referred to herein as corresponding points.

In locating relatively the monitor and the piece under test for the gauging operation, the monitor is placed in this predetermined opposed position with relation to the piece under test in the direction of the line of the beam so that the dimension of he monitor at each point therein in the direction of the line of the beam added to the dimension of said piece at an opposed or corresponding point in said direction will always equal a constant sum.

The present invention may be employed in gauging various dimensions of an object of irregular contour. In the present application the invention is first described as applied to the gauging of the thickness of an object of such contour.

The device or piece to be gauged may have any desired irregular contour. Figs. 1, 2 and 6 show clearly the shape of the piece the dimensions of which are to be gauged. The body of the piece, indicated at 32, is substantially semielliptical in cross section and diminishes in thickness from the lower end of the body to the upper end thereof. This tapering body is attached to a portion 34 forming a base by which the piece is secured to a suitable support to hold the body in proper position during the gauging operation of the present apparatus. In the formation of a completed article, the base portion 34 is removed from the body portion.

In gauging the thickness of the body 32 of the piece 30, shown in Figs. 1, 2 and 6 which constitutes the piece under test, the piece is secured on a supporting device or carriage in a position between the screens 12 and 16 such that the beam x—x from the X-ray source passes through the body portion of the piece in the direction of its thickness. A monitor indicated at 36 is also mounted on said support in a position between the screens 12 and 16 so that the beam passing through the body of the piece under test will also pass through the monitor in the direction of its thickness.

The monitor 36 shown in Figs. 1 and 2 of the drawings consists of a rectangular prism or plate of greater length and width than the body of the piece to be tested. This monitor which is constructed particularly for use in gauging the thickness of the piece under test is made of the same material as the piece under test or material having substantially the degree of penetration by X-ray. The monitor 36 has a special formation for the particular form or contour of the body 32 of the piece 30 the thickness of which is to be gauged. The monitor is so formed that when it is placed in a predetermined opposed position with relation to the piece under test in the direction of the line of the beam, the thickness of a portion of the monitor at each point therein added to the thickness or intended thickness of the piece at each opposed or corresponding point in the direction of said line will always equal a constant sum. In locating relatively the monitor 36 with relation to the body 32 of the piece 30 for the gauging of the thickness of said body, the monitor is located in said predetermined opposed position with relation to the body 32 of the piece 30 in the direction of the line of the beam. By intended thickness is meant the thickness of a perfect piece. The monitor is machined out to form a recess 38 having substantially the same lengthwise and widthwise dimensions as the body 32 of the piece under test. This recess is so shaped that that part of the monitor in which it is formed is complementary to the body portion of the piece under test. That is, the thickness of the monitor measured at each point in the recess, added to the thickness of the body portion of a perfect piece, measured at each corresponding point, is always equal to a constant sum. The thickness of the portion of the monitor outside the recess at all points is made equal to the constant sum. In locating the monitor for the gauging operation, the monitor is fixedly mounted in an upstanding position on the carriage with the recess extending substantially vertically thereon.

In locating the monitor and the piece under test in positions in the apparatus for the passage of the X-ray beam therethrough, the said piece and the monitor are positioned with relation to each other and to the line of the beam indicated at x—x so that the piece under test and the monitor stand in complementary opposed relation in the direction of the line of the beam. When in these relative positions, the thickness or intended thickness of the piece under test at any point therein plus the thickness of the monitor at a point in opposed position with relation to said first point in the direction of the beam is a constant sum.

The monitor 36 is supported in the apparatus in an upstanding position for the passage of the X-ray beam through the same as shown in Figs. 1 and 2. The monitor is located in a predetermined angular position about a vertical axis, in a predetermined angular position about a horizontal axis perpendicular to the line of the beam, and about a horizontal axis parallel with the line of the beam so that the beam will always pass through the monitor in the direction of the thickness dimension thereof.

The monitor is also mounted for adjustment in a vertical direction and in a horizontal direction perpendicular to the direction of the line of the beam to locate the same in a vertical direction and in a horizontal direction to correspond with the position of the piece under test.

The piece under test is supported in the machine in a position such as that shown in Figs. 1 and 2 for the passage of the beam x—x through the same. The supporting mechanism for said piece is constructed to enable the piece to be adjusted about different axes to locate said piece in an angular position for the passage of the beam therethrough in the desired direction. In the present construction, said mechanism is constructed to enable the piece to be rocked about a horizontal axis 37 extending substantially perpendicular to the direction of the line of the beam, this axis being located within the piece adjacent the lower end thereof. The said supporting mechanism is also constructed to enable the piece to be rocked about a horizontal axis 39 extending transversely of the piece in a direction substantially parallel with the direction of the line of the beam, this axis also being located adjacent the lower end of the piece. Said supporting mechanism is also constructed to enable the piece under test to be rotated about a vertical axis passing through the piece under test, this axis being indicated at 41 in Fig. 17.

The monitor and the piece under test are aligned and located on the supporting mechanism so that the beam from the X-ray source, when directed from the X-ray source through the body of the piece under test and through the monitor, will always pass through corresponding points in the piece under test and the monitor. These points are such that when the piece under test is a perfect piece, having the intended thickness at all points, the combined thickness of the piece under test and the monitor at each point in said piece through which the beam is passed will always be the same and will thus result in a uniform action in the detector and in the indicating and/or recording mechanism controlled by the detector. When the piece under test varies in thickness at any point from the intended thickness, the combined thickness of the piece under test and the monitor passed through at this point by the beam from the X-ray source will have a corresponding variation in the action of the detector and of the indicating and/or recording mechanism controlled by the detector.

In the construction shown, the supporting means for the monitor comprises a table 40 having a substantially horizontal upper surface upon which the monitor is supported with one end face of the monitor resting on the upper surface of the table so that the monitor is supported in a substantially vertical position. The monitor is secured rigidly to the table 40 preferably by means of screws extending upwardly through holes in the table and threaded into the base of the monitor.

The monitor is thus secured to the table in a predetermined position about a vertical axis, about a horizontal axis perpendicular to the line of the beam and about a horizontal axis parallel with the line of the beam, the position about these axes being such that the beam will always pass through the monitor in the scanning operation in the direction in which the thickness of the monitor is measured.

The apparatus shown in this application is provided with means by which the monitor may be adjusted in a horizontal direction substantially perpendicular to the line of the beam and with means by which the monitor may be adjusted in a vertical direction.

The table 40 is provided with a rib 77, dovetail in cross section, which slidably engages in a horizontal dovetail guideway in a block 79, the rib and guideway extending in a horizontal direction in a plane substantially perpendicular to the direction of the line of the X ray beam. The rib is adjusted in the guideway to adjust the table in said direction by means of an adjusting screw 81 threaded into said block and having a hand wheel 83 for rotating the same. The screw is provided with a collar 85 having a groove 87 and the rib is connected with the screw by means of a projection 89 extending from one end of the rib and having a downturned outer end portion engaging in the groove in said collar. By the rotation of the screw 81, the table 40 may be adjusted horizontally in a direction substantially perpendicular to the direction of the line of the beam to adjust correspondingly the horizontal position of the monitor.

The block 79 is provided with an extension 91, dovetail in cross section, which engages in a vertical dovetail groove in a block 93 supported on and secured to the parallel bars 95 forming parts of a subcarriage on which the piece under test and the monitor are supported during the scanning operation. The block 79 is adjusted vertically with relation to the block 93 to adjust the monitor vertically by means of an adjusting screw 97 passing freely through an opening in one of the bars 95 and threaded into the extension 91, the screw having a hand wheel 97a. The screw is provided with a collar 99 fixed thereto and the screw is held from longitudinal movement in the bar 95 by means of a retaining device 101 secured to the bar 95 and engaging the outer face of the collar as shown in Fig. 2. By the rotation of screw 97, the table 40 may be adjusted vertically to adjust the vertical portion of the monitor.

As above stated, the piece to be tested comprises a body portion 32 of the desired contour and a base 34 upon which the body portion is mounted. The body portion constitutes the part the thickness of which is to be gauged and the piece is secured in the apparatus by means of a clamp 46 engaging the base.

The clamp comprises a body 48 secured in a suitable support for certain adjustments and a head having relatively movable clamping jaws. A portion of the head indicated at 52 forms a fixed clamping jaw. Mounted in a slot 54 in the body and extending into an aligned slot in the head is a clamping lever 56 pivoted at 58 to the body. The clamping lever 56 is provided with a pin 60 extending upwardly therefrom upon which is pivoted a block 62 forming a movable clamping jaw cooperating with the fixed jaw 52.

The clamping lever is provided with an actuating screw 64 threaded into an opening in the lower end of the lever, the inner end of which screw is arranged to engage the body of the clamp within the slot 54. By the rotation of this screw in opposite directions the clamping lever is actuated and controlled to clamp and release the piece to be tested.

In positioning and clamping the piece under test, assuming that the jaws of the clamp are in relatively open positions, the piece is manipulated to locate the base 34 between the jaws of the clamp and to locate the body in the upstanding position shown in Figs. 1 and 2 and the screw 64 is then actuated to close the clamping jaws relatively to clamp the base of the piece fixedly to the clamp. To enable the piece under test to be located in the proper position with relation to the direction of the X-ray beam and to the monitor 36, the apparatus comprises devices for adjusting the clamp in a plurality of different ways. The body of the clamp passes centrally through a dish shaped supporting member 66 and is fixedly secured to said member as by a set screw 68. This dish shaped member extends at its margin between the bearing surface 70 formed on the body of a bearing block 72 and a bearing surface 74 formed on the under side of an extension on said block overhanging the margin of the member 66, antifriction bearings 74a being located between the margin of the member 66 and the bearing surfaces 70 and 74 on the bearing block 72. The bearing surfaces of the support member 66 and those of the bearing block 72 are concentric spherical surfaces having a common center located at 76. This mechanism for supporting the dish shaped member 66 enables said member to be rocked in any direction about the point 76 and to be rotated about a vertical axis passing through said point.

The mounting of the clamp supporting member 66 in the manner described for rocking movements enables the piece under test to be rocked about the two horizontal axes 37 and 39 and the vertical axis about which the piece is adjustable to locate the piece in a predetermined position with relation to the monitor and to the direction of the line of the beam for the scanning operation. This manner of mounting the member 66 determines the positions of the said horizontal axes 37 and 39 and said vertical axis all of which pass through said point 76.

The mounting of the clamp 48 in the manner described upon the supporting member 66 enables the clamp and the piece under test to be rocked in any direction about the point 76 and to be rotated about a vertical axis passing through said point by imparting certain movements to the member 66. The present apparatus includes means for rocking the clamp about the point 76 in a vertical plane substantially perpendicular to the direction of the line of the X-ray beam and means for rocking the clamp about the point 76 in a vertical plane substantially parallel with the direction of the line of the beam. The body 48 of the clamp is formed at its lower end with a ball-like bearing element 78 which engages in a recess 80 in a slide 82 secured to the under side of a lever 84. This lever is pivoted to swing about a vertical axis upon a stud 84a extending downwardly from a vertical supporting bar 85a secured at its upper end to a bar 86a interposed between and attached to the bars 95 forming parts of a supporting carriage for the clamp mechanism. The portions of the slide forming the walls of the recess 80 extend upwardly from the body of the slide through a longitudinal slot 86 in the lever. The slide is attached to the lever 84 for sliding movements longitudinally of the lever by bolts 88 passing downwardly respectively through slots 90 in the lever and corresponding openings in the slide. The mechanism for moving the slide longitudinally comprises a link 92 connected at one end with a downwardly extending arm 94 on the slide and at the other end with a hand lever 96 pivoted at 98 to the outer end of the lever 84, the lever 96 terminating at its lower end in a handle 100 for manual operation.

With this construction, by swinging the lever 96 in opposite directions about its pivot 98, the slide 82 is moved longitudinally of the lever 84 to rock the clamp 46 and the piece under test about the point 76 in a vertical plane substantially parallel with the direction of the line of the beam. Also, by operaing the lever 96 to swing the lever 84 about its axis and at the same time swinging the lever 96 about its axis to actuate the slide 82 to compensate for the pivotal movement of lever 84, the clamp 46 may be rocked about the point 76 in a vertical plane substantially perpendicular to the line of the beam.

The clamp 46 and the piece under test may be given rotary movements about a vertical axis extending through the point 76 by imparting rotary movements to the dish shaped member 66 about said axis. To this end the member 66 is formed on its margin with a projection 102 extending through a slot 103 in the adjacent portion of the block 72 into a position readily accessible to the operator of the mechanism. By the movement manually of this projection on the member 66, said member may be readily rotated about said axis.

In order to hold the clamp and the piece under test in the position in which they are adjusted by the adjustment of the clamp or by the adjustment of the member 66, a screw 104 is threaded into a portion of the bearing block 72 adjacent the margin of the member 66 and is arranged to engage, at its inner end, the said member. The screw 104 is provided with a hand wheel 105a.

The devices for supporting the piece under test and the monitor are moved relatively to the devices for producing and controlling the X-ray beam to cause the beam to traverse a predetermined path with relation to the piece and the monitor in the scanning operation. Fig. 6 of the drawings shows one scanning pattern which the beam may be caused to traverse on the present apparatus.

In moving the devices for supporting the piece under test and the monitor to cause the beam to traverse this pattern, the said devices are moved vertically to cause he beam to traverse the piece vertically from a point adjacent one end thereof to a point adjacent the opposite end thereof. During their vertical movement, said devices are moved horizontally to cause the beam to traverse the piece horizontally along the lines shown in Fig. 6.

The bearing block 72 which supports the dish shaped member 66 to which the clamp 46 is secured rests upon and is fixedly attached to a framework comprising the parallel bars 95 and the transverse bar 86a, this framework forming a movable subcarriage on which the clamping device and the piece under test, the table 40, and the monitor are carried and by which horizontal movements are imparted to these parts during a scanning operation. This carriage is mounted to slide horizontally on parallel horizontal guide rods 106 extending through openings in the end portions of the bars 95. The opposite ends of each guide rod are secured respectively in the opposed arms of two slides 108 and 110 mounted to slide vertically on the parallel vertical guide rods 112 secured at their ends respectively in a base 114 and in a cap piece 116 of the frame. The slides 108 and 110 and connecting rods 106 form a framework constituting the main carriage on which the subcarriage is carried and by which vertical movements are imparted to the clamp, the piece under test, the table 40 and the monitor during a scanning operation.

The mechanism for moving vertically the main carriage comprises two actuating screws 118 and 120 threaded throughout their lengths and each having its end portions engaging in suitable bearings formed respectively in the base 114 and the cap piece 116. These screws are threaded through correspondingly threaded openings in the slides 108 and 110. Each of these screws extends through a corresponding bearing in the cap piece 116 and is connected by bevel gearing 121 with the ends of a horizontal shaft 122 mounted in bearings formed in brackets 124 secured to the upper face of the cap piece 116. The shaft 122 passes through a bear box 124 secured to the upper face of the cap piece 116 and is connected by bevel gearing within said gear box with the shaft 130 of an electric motor 132 of the type constructed to be driven in reverse directions and known in the art as reversible motors.

The mechanism for moving the subcarriage back and forth horizontally during the vertical movements of the main carriage comprises a horizontally arranged screw threaded shaft 134 threaded through correspondingly threaded openings in the bars 95 of the subcarriage. The ends of the shaft 134 engage in suitable bearings formed in the slides 108 and 110. The shaft 134 is driven alternately in opposite directions from an electric motor 136 of the reversible type attached to the slide 110 through spur gearing located in a gear box 140 also attached to said slide.

The electrical connections for the two motors are shown diagrammatically in Fig. 5. The motor 132 is provided with a terminal 142 connected by a conductor 144 with the main line conductor 146. The terminal 142 is connected with the field coil circuit and the brush circuit of the motor. These circuits are also connected with the terminal 148 of the motor so that the current passes from the terminal 142 through the field coil circuit and brush circuit in one direction to the terminal 148. The motor is also provided with a terminal 150 connected with the field coil circuit and with the brush circuit of the motor. These circuits are also connected with the terminal 152 of the motor so that the current passes from the terminal 150 through the field coil circuit and the brush circuit in the opposite direction to the terminal 152. The terminal 152 of the motor is connected by a conductor 153 with the main line conductor 144. The passage of the current in opposite directions through the field coil circuit and the brush circuit of the motor causes the motor to be driven in opposite directions.

The control mechanism for the motor 132 comprises a switch 154 having the contacts 156, 158, 160 and 162. The terminal 148 of the motor is connected with the switch contact 156 by a conductor 164. The terminal 150 of the motor is connected with the switch contact 160 by a conductor 166.

The switch 154 is provided with a switch contact 172 which is mounted for movement laterally of the switch in opposite directions between a position in which it engages the contacts 162 and 160 to connect these contacts as shown in Fig. 5 and a position in which it engages the contacts 156 and 158 to connect these contacts. The position of the switch contact 172 is controlled manually by means of a bell crank lever 177 pivoted at 179 upon the upwardly extending arm of which the contact is supported in any suitable manner. The bell crank is swung about its pivot manually to shift the contact from one position to the other.

The terminals of the motor 136, the connection of the brush circuit and the field coil circuit with said terminals, the conductors connecting the terminals of the motor with the main line conductors, the switch for controlling the connections to cause the passage of the current in opposite directions through the brush circuit and the field coil circuit, the conductors for connecting the terminals of the motor with the terminals of the switch and the shiftable switch contact all have substantially the same construction arrangement and mode of operation as the corresponding parts of the motor 132, the electrical connections for the motor 132 and the means for controlling the latter motor. These elements associated with the motor 136 which correspond respectively with the elements associated with the motor 132 are indicated in the drawing by the same reference numerals as those applied to the elements associated with motor 132 with the letter "a" added in each instance.

The contact 172 is mounted in any suitable manner upon the upper end of a lever 199 pivoted at 201. The lever is shifted automatically to shift the contact from one operative position to the other as the subcarriage approaches the end of its movement in each direction to reverse the direction of movement of the carriage. The main line conductor 146 receives current from a main line conductor 174 through a switch 175 which is of the push button type and normally occupies the position shown in Fig. 6, thereby disconnecting the main line conductors 174 and 146.

The mechanism for controlling the upward movement of the main carriage comprises a switch 176. This switch includes a fixed contact 178 mounted in a casing 180 secured to one of the vertical guide rods 112. A switch lever 182 is pivoted at 184 in this casing and carries a switch contact 186 which normally is held in engagement with the contact 178 by the action of gravity and by a tension spring 188 connecting the lever 182 with a pin extending from the wall of the casing 180. The switch contact 186 is connected by a conductor 190 with the main line conductor 174. The contact 178 is connected by a conductor 191 with a corresponding contact of a switch for controlling the downward movement of the main carriage.

The switch lever 182 is lifted to disengage the contact 186 from the contact 178 by means of a pin 192 mounted to slide vertically in suitable openings formed respectively in the lower wall of the casing and in a guide member 194 secured to a side wall of the casing. The pin 192 is acted upon by a compression spring 196 interposed between the guide 194 and a collar 198 secured to the pin. The downward movement of the pin in the casing under the action of the spring is limited by the engagement of the collar 198 with the lower wall of the casing.

The mechanism for controlling the downward movement of the main carriage is similar in construction to the mechanism for controlling the upward movement of the carriage but, of course, the action of said first mechanism is reversed as compared with the action of said second mechanism.

The mechanism for controlling the downward movement of the main carriage comprises a plurality of elements corresponding in construction arrangement and mode of operation to the elements of the mechanism above described for controlling the upward movement of the carriage, the elements of the former mechanism having the same reference numerals with the addition of the letter "a" applied thereto as the reference numerals applied to the latter mechanism.

The mechanism for controlling the downward movement of the main carriage comprises a switch 176a including a fixed contact 178a fixedly mounted in a casing 180a secured to the other of the vertical guide rods 112. A switch lever 182a is pivoted at 184a in the casing and carries a switch contact 186a which normally is held in engagement with the contact 178a by a tension spring 188a. The contact 186a is connected by a conductor 190a with the main line conductor 146. The contact 178a is connected by the conductor 191 with the contact 178 of the switch 176.

The switch lever 182a is depressed to disengage the contact 186a from the contact 178a by means of a pin 192a mounted to slide vertically in suitable openings formed respectively in the upper wall of the casing and in a guide member 194a. The pin 192a is acted upon by a compression spring 196a interposed between the guide 194a and a collar 198a secured to the pin. The upward movement of the pin in the casing under the action of the spring is limited by the engagement of the collar 198a with the upper wall of the casing.

The pin 192 is moved upwardly to lift the switch lever 182 to disengage the contact 186 from the contact 178 and thereby disconnect the main line conductor 174 from the main line conductor 146 at a predetermined point in the upward movement of the main carriage by the engagement of the slide 108 with the lower end of the pin. The pin 192a is moved downwardly to depress the switch lever 182a to disengage the contact 186a from the contact 178a and thereby disconnect the main line conductor 174 from the main line conductor 146 at a predetermined point in the downward movement of the main carriage by the engagement of the slide 108 with the upper end of the pin.

The mechanism above described for imparting vertical movements to the main carriage have the following mode of operation: Assuming that the push button switch 175 is held in open position by its spring and that the main carriage is in its uppermost position with the switch 176 held open by the slide 108 and the pin 192 and that the switch 176a is held closed by the spring 188a, in throwing the motor 132 into operation to drive the main carriage downwardly, the operator first operates the bell crank lever 177 to shift the switch contact 172 to connect the contact 156 with the contact 158 and then presses the push button 175 to connect the main line conductor 174 with the main line conductor 146. This closes a circuit through which current passes through the motor 132 in one direction. This circuit may be traced as follows: conductor 174, push button switch 175, conductor 146, conductor 144, terminal 142 of the motor, brush circuit and field circuit of the motor, terminal 148 of the motor, conductor 164, contact 156 of the switch 154, contact member 172 of the switch, contact 158, and conductor 168 to main line conductor 145.

By the passage of the current in the direction through the motor produced by this adjustment of the switch member 172, the shaft of the motor is driven in a direction to rotate the actuating screws to move the carriage in a downward direction.

The push button switch 175 is held depressed until the carriage moves downwardly far enough to allow the switch 176 to be closed by the action of the spring 188 and is then released, the switch 175 then being opened by its actuating spring. The current from the main line conductor 174 then passes to the main line conductor 146 through a circuit which may be traced as follows: conductor 174, conductor 190, contact 186, contact 178, conductor 191, contact 178a, contact 186a, and conductor 190a to main line conductor 146.

The motor is driven in the direction to lower the main carriage until, when the carriage reaches a predetermined point adjacent its lower limiting position, the slide 108 engages the pin 192a and depresses the same and the lever 182a to disengage the contact 186a from the contact 178a, thereby breaking the motor circuit and stopping the motor.

With the carriage in its lowermost position, and the push button switch and the switch 176a open, in throwing the motor 132 into operation to drive the main carriage upwardly, the operator first operates the bell crank lever 177 to shift the contact member 172 into position to connect the contacts 160 and 162 and then depresses the push button switch 175 to connect the main line conductor 174 with the main line conductor 146. This closes a circuit along which the current passes through the motor in a direction opposite to that in which the current passes when the contacts 156 and 158 are connected by switch member 172. This circuit may be traced as follows: Main line conductor 174, push button switch 175, main line conductor 146, conductor 170, contact 162 of switch 154, contact member 172, contact 160 of said switch, conductor 166, terminal 150 of the motor, brush circuit and field circuit of the motor, terminal 152 of the motor and conductor 153 to the main line conductor 145.

By the passage of the current through the motor 132 in the direction produced by this adjustment of the switch member 172, the motor is driven in a direction to rotate the actuating screws to move the carriage in an upward direction.

The push button switch 175 is held depressed until the carriage moves upwardly far enough to allow the switch 176a to be closed by the action of the spring 188a and is then released allowing the switch 175 to be opened by its actuating spring. The current from the main line conductor 174 then passes to the main line conductor 146 through a circuit which is the same as that described above, as established when the carriage was being driven downwardly following the closure of the switch 176.

The motor 132 is driven in a direction to elevate the main carriage until when the carriage reaches a predetermined position adjacent its upper limiting position, the slide 108 engages the pin 192 and elevates the same and the lever 182 to disengage the contact 186 from the contact 178 thereby breaking the motor circuit and stopping the motor.

The mechanism for controlling the current through the motor 136 by which the horizontal movements in opposite directions are imparted to the subcarriage during the vertical movements of the main carriage operates in a manner similar to the mechanism for controlling the current through the motor 132. In the former mechanism, however, the direction in which the current is passed through the motor 136 is reversed automatically to reverse the direction of rotation of the main shaft of the motor substantially when the subcarriage reaches the predetermined limit of its movement in each direction.

The mechanism for shifting automatically the lever 199 to shift the contact 172a from one operative position to the other comprises a longitudinally movable rod 205 having one end thereof pivotally connected at 203 with the lower end of the lever. The opposite end portion of the rod is slidably engaged in an opening in an angular supporting plate 207 secured to the under side of the slide 108. Between its ends, the rod 205 is slidably engaged in an opening in an angular actuating plate 209 secured to the under side of one of the bars 95 of the subcarriage. Mounted on the rod 205 on opposite sides of the actuator plate 209 and in predetermined spaced relation to each other are two collars or disks 211 and 213 arranged respectively to be engaged by the actuator plate during the horizontal movement of the subcarriage in opposite direction. The actuator plate thus will shift the rod 205 and the lever 199 to shift the contact member 172a from engagement with one set of contacts of switch 154a to engagement with the other set of contacts of the switch substantially as the subcarriage reaches the limit of its movement in each direction.

Assuming that the parts of the mechanism for controlling the current through the motor 136 are in the condition shown in Fig. 5, the rod 205, the lever 199 and the contact member 172a having been moved into the positions shown in this figure by the movement to the left, Fig. 3, of the subcarriage during the preceding horizontal traverse of the carriage, and also assuming that the main line conductor 174 is connected with the main line conductor 146, said mechanism has the following mode of operation: the current from the main line conductor 146 passes through the motor 136 in one direction along a circuit which may be traced as follows: conductor 146, conductor 170a, contact 162a of switch 154a, contact member 172a, contact 160a of the switch, conductor 166a, terminal 150a of motor 136, brush circuit and field circuit of the motor, motor terminal 152a, and conductor 153a to main line conductor 145. The current through this circuit causes the rotation of the main shaft of the motor in one direction to move the subcarriage in a right-hand direction, Fig. 3. When the carriage reaches substantially the predetermined limit of its movement in a right-hand direction, the plate 209 carried by the carriage engages the collar 213 mounted on the rod and moves the rod to the right to shift the lever 199 and the contact member 172a into position to engage said member with the contacts 156a and 158a to reverse the direction of rotation of the motor 136.

With the contact member 172a shifted into this position, the current from the main line conductor 146 passes through the motor 136 along a circuit which may be traced as follows: conductor 146, conductor 144a, motor terminal 142a, brush circuit and field circuit of the motor, motor terminal 148a, conductor 164a, contact 156a of switch 154a, contact member 172a, switch contact 158a and conductor 168a to main line conductor 145. This circuit causes the passage of the current through the motor in a direction opposite to that in which the current passes when the contact member is positioned to connect the contacts 160a and 162a and the motor is driven in a direction to move the carriage toward the left, Fig. 3. When the carriage reaches substantially the predetermined limit of its movement in a left-hand direction, the plate 209 carried by the carriage engages the collar 211 mounted on the rod 205 and moves the rod to the left, Fig. 3, to shift the lever 199 and the contact member 172a to disengage said member from the contacts 156a and 158a and to engage said member with the contacts 160a and 162a. This shift in the position of the contact member 172a reverses the direction of the current through the motor 136 to cause the driving of the motor in a direction to move the subcarriage in a right-hand direction, Fig. 3.

The horizontal movements of the subcarriage back and forth in opposite directions begin with the closing of the push-botton switch to connect the main line conductors 174 and 146. These movements are stopped when either the switch 176 or the switch 176a is opened to cause the stoppage of the vertical movement of the main carriage, the opening of either of these switches disconnecting the main line conductor 174 from the main line conductor 146.

Fig. 7 of the drawing shows an object or piece 200 of irregular contour having a form substantially different from that shown in Figs. 1, 2 and 6 and a monitor 202 constructed for gauging or testing the thickness of an object of the said form by means of a beam $x$—$x$ of penetrating rays. The object and the monitor are shown as set up on the apparatus illustrated in Figs. 1, 2 and 3 for the passage of the beam $x$—$x$ through the object and the monitor in the direction in which thickness is gauged.

The line $c$—$c$ in Fig. 7 is a line drawn in predetermined relation to the contour of the object shown in plan from a point $d$ at the extreme left of the object to a point $e$ at the extreme right of the object, the distance between these points being the width of the object. The line is shown as extending outwardly at its ends beyond the points $d$ and $e$. The thickness of the object is gauged in direction perpendicular to the width line extending between the points $d$ and $e$ and to the line $c$—$c$ which constitutes an extension of the width line. This direction is indicated by the line $x$—$x$ of the beam in Fig. 7. The line $c$—$c$ may hereinafter be referred to as the reference line for gauging thickness. When the object is secured in the clamp 46 for the gauging of the thickness thereof, the clamp and the piece 200 held in the clamp may be adjusted about a substantially vertical axis to locate the piece in the required angular position in a horizontal plane with relation to the monitor. This axis may be located in different positions transversely with relation to the piece by varying the position of the piece in the clamp. As shown in Fig. 7, the axis is indicated at $c^x$ and is located midway between the points $d$ and $e$. The lines $c'$—$c'$ and $c^2$—$c^2$ indicate the different positions into which the line $c$—$c$ may be shifted by the adjustment of the piece in opposite directions about a vertical axis passing through the point $c^\times$.

The monitor 202 is shown in Fig. 7 as formed with a recess 204 of such shape and dimensions that the thickness of the piece at any point therein added to the thickness of the monitor at a corresponding point always gives a constant sum if the piece is a perfect piece having the required or intended thickness at all points. With the piece and the monitor located in the relative positions shown in Fig. 7, the corresponding points on the piece and the monitor are located in opposed relation to each other in the direction of the line of the beam. The thickness of the portion of the monitor outside the recess at all points is equal to the constant sum. It will be noted that on the drawing of the piece 200, there are two lines each having arrow heads at the ends thereof and extending in a direction perpendicular to the reference line for thickness $c$—$c$ and indicating the thickness of the piece at the points at which they are located. Also on the drawing of the monitor there are two lines located opposite the said lines on the drawing of the piece in the direction of the line of the beam each having arrow heads at the ends thereof and indicating the depth of the recess in the monitor at the points at which they are located. These lines on the drawing of the piece are equal in length respectively to the opposed lines on the drawing of the monitor and are placed on the drawing as examples to indicate the equal relationship of the thickness of the piece at each point therein and the depth of the recess at each corresponding point if the piece has the desired or intended thickness at all points.

Fig. 8 shows, in front elevation, the piece 200 in the position which it assumes when clamped in an upright position in the clamp 46. When clamped in this position, the piece may be rocked in opposite directions about a horizontal axis passing through the point 206 in the piece adjacent the base thereof and substantially parallel with the line of the beam to adjust the piece in proper relation to the monitor for the gauging of the thickness of the piece. This view illustrates in dotted lines the positions in which the piece may be adjusted by these rocking adjustments.

Fig. 9 is a view in side elevation showing the piece 200 in the position which it assumes when clamped in an upright position in the clamp 46. When clamped in this position, the piece may be rocked in opposite directions about a horizontal axis passing through the point 208 in the piece in a horizontal direction substantially perpendicular to the direction of the line of the beam to adjust the piece in proper relation to the monitor for the gauging of the thickness of the piece.

Fig. 10 is a plan view illustrating the application of the present method and apparatus to the gauging of dimensions other than thickness of an object of irregular contour. This view shows the object piece 200 of irregular contour located in the apparatus in another position for the gauging operation by the beam $x$—$x$. The said piece in this case is shown as located in the apparatus with the reference line $c$—$c$ extending at an oblique angle to the direction or line of the beam $x$—$x$. The said piece is located in the position shown in Fig. 10 by adjusting the same about the vertical axis passing through the point $c^\times$ in the line $c$—$c$. This adjustment is obtained by the adjustment of the clamp in which the piece is held about a vertical axis.

The monitor 208 shown in Fig. 10 as associated with the object 200 has a different formation from that shown in Fig. 7 to correspond with the different position of the object and is shown as located in the proper position with relation to the object piece and the direction of the beam $x$—$x$ for the gauging operation. The formation of the monitor 208 is such that when the object and the monitor are set up in the apparatus in the positions shown with relation to each other and to the direction of the beam, the dimension of the object at each point therein in the direction of the beam plus the dimension of the monitor at each corresponding point in the direction of the beam will always equal a constant sum if the object is a perfect piece. The dimension of the portion of the monitor 208 surrounding the recess 210 in the direction of the line of the beam also equals the constant sum.

Fig. 11 also is a plan view illustrating the application of the present method and apparatus to the gauging of further dimensions other than thickness of an object of irregular contour. This view shows the object piece 200 located in the apparatus in another position for the gauging operation by the beam $x$—$x$. The said piece in this case is shown as located in the apparatus in a position with the reference line $c$—$c$ extending at another oblique angle to the direction of the line of the beam $x$—$x$. The piece is located in this position also by adjusting the same about the vertical axis passing through the point $c^\times$ in the line $c$—$c$ and this adjustment is obtained by the adjustment of the clamp 46 about a vertical axis.

The monitor 212 associated with the object 200 shown in Fig. 11 has a different formation from the monitor 202 shown in Fig. 7 and the monitor 208 shown in Fig. 10 to correspond with the different position of the object as shown in Fig. 11. The monitor is shown in Fig. 11 in the proper position with relation to the object piece and the line of the beam for the gauging operation to gauge additional dimensions of the object in the direction of the line of the beam. Here again, the formation of the monitor is such that when the monitor and the object are set up in the apparatus in the positions shown with relation to each other and to the line of the beam, the dimension of the object at each point therein in the direction of the line of the beam plus the dimension of the monitor at each corresponding point in said direction always will equal a constant sum if the object is a perfect piece. The dimension of the portion of the monitor 210 surrounding the recess 211 in the direction of the line of the beam also equals the constant sum.

By subjecting the piece under test to an analysis by the X ray beam in the manner shown in Figs. 1, 2, 6 and 7 to determine whether the thickness dimensions of the piece at all points in the piece along the line of the scanning pattern conform to the thickness dimensions of a perfect piece at all corresponding points, subjecting the piece to an analysis by the X ray beam in the manner shown in Fig. 10 to determine whether the dimensions of the piece in one direction oblique to the direction in which thickness of the piece is measured, at all points along a scanning pattern conform to the dimensions of a perfect piece in the same direction at all corresponding points and subjecting the piece to an analysis by the X ray beam in the manner shown in Fig. 11 to determine whether the dimensions of the piece in another direction oblique to the direction in which thickness of the piece is measured at all points along a scanning pattern conform to the dimensions of a perfect piece in the same direction at all corresponding points, an analysis of the contour of the piece under test is obtained to determine whether the piece conforms in contour with the contour of a perfect piece. The provision for the adjustment of the clamp for holding the piece under test about a vertical axis enables this plural angle analysis of the dimensions of the piece by the beam to be obtained.

Fig. 12 shows a zero reading recorder 214 having a needle 216 pivoted to swing along an arcuate scale 218 which may be used as the element 24 of the apparatus or system shown in Fig. 1 in scanning the object and the monitor to gauge the thickness of the object in the manner illustrated in Fig. 7 or in scanning the object and the monitor to gauge other dimensions of the object as illustrated in Figs. 10 and 11. Before starting the scanning operation the subcarriage is positioned to cause the beam to pass through the marginal portion of the monitor outside of the recess in the monitor and the recorder is set at zero for the extent of penetration of the beam through this marginal thickness of the monitor. Then during the scanning operation, the recorder needle will give a zero reading at all times when the combined thickness or other dimensions of the object and the monitor is equal to the thickness of the marginal portion of the monitor for which the recorder was set. When the combined thickness or other dimensions of the portions of the object and the monitor passed through by the beam in the scanning operation is greater or less than the thickness of the marginal portion of the monitor, the needle of the recorder will give a positive or negative reading indicating the excess or deficiency of the dimension and the extent thereof.

The apparatus disclosed with the substitution of a galvanometer 220 for the recorder 24 shown in Fig. 1 may be employed in gauging the dimensions of an object by step-by-step reading. This galvanometer is provided with a needle 222 pivoted to swing along an arcuate scale 224, divided into any desired number of equal divisions. Under the influence of the electric current signal produced by the detector 18 the galvanometer needle 222 is swung to the right, Fig. 14, from its zero position in which it is shown in said figure to a degree varying with the strength of the signal.

Fig. 13 shows diagrammatically the manner in which the dimensions of a piece of irregular contour may be step read on the present apparatus. The step reading procedure may be used to determine whether certain dimensions of an object of irregular contour are substantially the same as the corresponding dimensions of a master. The step reading procedure and its application to a method of gauging the dimensions of an object of irregular contour will be explained together.

In this method, first a perfect or master piece is step read upon the apparatus. The master 226 is secured in upright position in the clamp 46 and is located in any desired position about the horizontal axes about which the clamp may be rocked and about the vertical pivotal axis of the clamp as shown in plan in Fig. 13. The subcarriage is then adjusted horizontally to locate the master in a position with relation to the X-ray source and associated beam control mechanism for the passage of the beam through the master along the dot and dash line A, Fig. 13, and the beam is then projected along this line. This causes the needle 222 of the galvanometer to swing to the right to a point opposite a predetermined division of the scale from the left-hand end of the scale. This position of the needle is marked 1/A. The subcarriage is then shifted horizontally to the left, Fig. 13, to locate the master in position with relation to the X-ray source and beam control mechanism for the passage of the beam through the master along the dot and dash line B, Fig. 13, and the beam is then projected along this line. This causes the needle 222 of the galvanometer to swing to the right to a point opposite another predetermined division of the scale from the left-hand end of the scale. This division is marked 2/B on the scale. The subcarriage is then again shifted horizontally to the left, Fig. 13, to locate the master in position with relation to the X-ray source and the beam control mechanism for the passage of the beam through the master along the dot and dash line C, Fig. 13, and the beam is then projected along this line. This causes the needle 222 to swing to the right to a point opposite another predetermined division of the scale of the galvanometer, reading from the left. This division is marked 3/C on the scale.

This procedure of step reading the respective dimensions of the master along the dot and dash lines D, E, F, and G is repeated by shifting the subcarriage to locate the subcarriage successively for the passage of the X-ray beam through the master respectively along the dot and dash lines, D, E, F, and G, projecting the beam successively along these lines and recording the position into which the needle of the galvanometer is swung by the passage of the beam along each of these lines.

The piece to be tested is then placed in the apparatus in the same position that the master was placed and the dimensions thereof are step read by the same procedure as that followed in step reading the corresponding dimensions of the master.

The piece is secured in an upright position in the clamp 46 and is located in the same position as the master was located by the adjustment of the clamp in the apparatus, thereby locating the piece in the same relation to the means for projecting and controlling the X-ray beam. Readings are then taken of the dimensions of the piece by projecting the beam successively through the piece along lines having the same relation to the piece as the lines A, B, C, D, E, F, and G of Fig. 13 have to the master. The reading of the galvanometer upon each projection of the beam through the piece is recorded or noted and compared with the reading when the beam was passed through a corresponding point in the master. A difference in the position of the needle of the galvanometer at any step in the taking of these readings of the dimensions of the piece under test from the position of the needle at a corresponding step in the taking of the readings of the dimensions of the master indicates a corresponding difference in the dimensions of the piece at a corresponding point.

The subcarriage may be adjusted horizontally in a direction transverse to the line of the X-ray beam to shift the master and the piece under test respectively with relation to the line of the beam to gauge the dimensions along the lines A, B, C, D, E, F, G in Fig. 13 by the rotation of the screw 134 manually. To facilitate the manual rotation of the screw, the screw may be provided with an extension 228 projecting beyond the slide 108 and with a hand wheel 230 attached to said extension.

To enable the piece to be marked for the removal of surplus material, prick punches 232 are mounted on the monitor 30 for slidable movement therein.

It is to be understood that the terms horizontal, vertical, upper, lower and similar terms employed in the specification are used for convenience in describing the particular form in which the invention is embodied as shown in the drawings and should not be regarded as restrictive.

It is to be understood that, except as defined in the claims, the invention is not limited to the specific construction of the illustrated embodiment of the invention but that this construction is merely illustrative of the invention and that the invention may be embodied in other forms within the scope of the claims.

Having explained the nature and object of the invention and having specifically described the method which is preferably followed in carrying out the invention and an apparatus embodying, in their preferred forms, the structural features of the invention, what is claimed is:

1. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, and a monitor supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and, the dimension of which portion at each point therein in the direction of the line of the beam added to the dimension of the object at each opposed point in said direction is always equal to a constant sum if the object is a perfect object.

2. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, and a monitor of solid material supported in the path of said beam for the passage of the beam therethrough simultaneously with its passage through the object and having a portion located in a predetermined opposed position with relation to said object in the direction of the line of the beam, the dimensions of which, at different points, measured in the direction of the line of the beam, vary in inverse relation to the dimensions of said portion of the object under test at corresponding opposed points and the dimension of which portion at each point therein in the direction of the line of the beam added to the dimension of the object at each opposed point in said direction is always equal to a constant sum if the object is a perfect object, the monitor also having a portion extending laterally thereof beyond said first portion the dimension of which in the direction of the line of the beam is equal to said constant sum.

3. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, a monitor of solid material supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and, the dimension of which portion at each point therein in the direction of the line of the beam added to the dimension of the object at each opposed point in said direction is always equal to a constant sum if the object is a perfect object, and means for causing the beam to traverse a predetermined scanning pattern on the object under test and the monitor.

4. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, a monitor of solid material supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and, the dimension of which portion at each point therein in the direction of the line of the beam added to the dimension of the object at each opposed point in said direction is always equal to a constant sum if the object is a perfect object, and means for moving the object under test and the monitor together transversely of the beam to cause the beam to traverse a predetermined scanning pattern on the object under test and the monitor.

5. An apparatus for gauging the thickness of an object of irregular contour comprising, a source of penetrating radiations, means for directing a beam of said radiations in a predetermined path, a detector located in the path of said beam, means for supporting an object formed with a portion having an irregularly variable thickness in the path of said beam in position for the passage of the beam through said portion in the direction of the thickness thereof in the gauging operation, and a monitor supported in the path of said beam in position for the passage of the beam therethrough in the direction of the thickness thereof simultaneously with its passage through the object and having a portion located in a predetermined opposed position with relation to said portion of the object in the direction of the line of the beam, the thickness of which portion of the monitor at each point therein added to the thickness of said portion of the object at an opposed point in said direction is always equal to a constant sum, if the object is a perfect object.

6. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, a monitor of solid material supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and, the dimension of which portion at each point therein in the direction of the line of the beam added to the dimension of the object at each opposed point in said direction is always equal to a constant sum, if the object is a perfect object, and means by which the piece and the monitor may be relatively adjusted to locate the said portion of the monitor in said predetermined opposed position with relation to said piece in the direction of the line of the beam.

7. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions of different points measured in the same direction for the passage of the beam therethrough in said direction in the gauging of said dimensions, a monitor of solid material supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and the dimension of which portion at each point therein in the direction of the line of the beam added to the dimension of the object at each opposed point in said direction is always equal to a constant sum, if the object is a perfect object, and means by which the piece and the monitor may be rocked relatively about one or more axes to adjust the same in predetermined opposed relation.

8. An apparatus for gauging the dimensions of an object of irregular contour comprising, a source of penetrating radiations, means for directing a beam of said radiations in a predetermined path, a detector located in the path of said beam, means for supporting an object formed with a portion having irregularly varying dimensions at different points measured in the same direction for the passage of the beam therethrough in said direction in the gauging of said dimensions, a monitor of solid material supported in the path of said beam for the passage of the beam therethrough simultaneously with its passage through the object and having a portion located in a predetermined opposed position with relation to said object in the direction of the line of the beam the dimensions of which, at different points, measured in the direction of the line of the beam, vary in inverse relation to the dimensions of said portion of the object under test at corresponding opposed points and the dimension of which portion at each point therein in the direction of the line of the beam added to the dimension of the object at each opposed point in said direction is always equal to a constant sum, if the object is a perfect object, and means by which the object and the monitor may be relatively adjusted vertically and horizontally to locate the same in perdetermined opposed relation in the direction of the line of the beam.

9. An apparatus for gauging the dimensions of an object of irregular contour comprising means for producing and projecting in a predetermined direction a beam of penetrating radiations, means for supporting an object of irregular contour and a monitor for said piece in predetermined opposed relation in the path of said beam, the dimension of the monitor at each point therein in the direction of the line of the beam added to the dimension of the object at each opposed point in said direction being always equal to a constant sum if the dimensions of the object are correct, said supporting means including a carriage mounted for movement in opposite directions, a second carriage mounted on said first carriage for movements in opposite directions transverse to the movements of the first carriage, upon which second carriage one of said means is mounted, means for imparting to the first carriage a continuous movement in one direction during a scanning operation, means for imparting to the second carriage a plurality of movements in opposite directions during a scanning operation and machine actuated and controlled mechanism for controlling said imparting means whereby the beam is caused to traverse a scanning pattern on the piece and the monitor.

10. An apparatus for gauging the dimensions of an object of irregular contour comprising a source of penetrating radiations, means for directing a beam of said radiations from said source in a predetermined path, a detector located in the path of said beam, means for supporting a piece under test and a monitor in predetermined opposed relation for the passage of the beam simultaneously therethrough, the dimension of the monitor at each point therein in the direction of the line of the beam added to the dimension of the object at each opposed point in said direction being always equal to a constant sum if the dimensions of the object are correct, said supporting means including a carriage mounted for continuous movement in one direction during a scanning operation, a second carriage mounted on said first carriage for movement therewith and for movement independently of said first carriage in opposite directions transverse to the direction of movement of said first carriage upon which second carriage the piece under test and the monitor are mounted, and machine actuated means for moving said carriages and controlling the movements thereof to cause the beam to traverse a scanning pattern with relation to said piece under test and the monitor.

11. An apparatus for gauging the dimensions of an object of irregular contour comprising a source of penetrating radiations, means for directing a beam of said radiations from said source in a predetermined path, a detector located in the path of said beam, means for supporting a piece under test and a monitor in predetermined opposed relation for the passage of the beam simultaneously therethrough, the dimension of the monitor at each point therein in the direction of the line of the beam added to the dimension of the object at each opposed point in said direction being always equal to a constant sum if the dimensions of the object are correct, said supporting means including a carriage mounted for continuous movement in one direction during a scanning operation, a second carriage mounted on said first carriage for movement therewith and for movement independently of said first carriage in opposite directions transverse to the direction of movement of said first carriage upon which second carriage the piece under test and the monitor are mounted, and means for moving said carriages to cause the beam to traverse a scanning pattern with relation to said piece under test and the monitor including an electric motor for driving said first carriage, a second electric motor for driving the second carriage, connected circuits for said motors and machine actuated means for controlling said circuits.

12. An apparatus for gauging the dimensions of an object of irregular contour comprising a source of penetrating radiations, means for directing a beam of said radiations from said source in a predetermined path, a detector located in the path of said beam, means for supporting a piece under test and a monitor in predetermined opposed relation for the passage of the beam simultaneously therethrough, the dimension of the monitor at each point therein in the direction of the line of the beam added to the dimension of the object at each opposed point in said direction being always equal to a constant sum if the dimensions of the object are correct, said supporting means including a carriage mounted for continuous movement in one direction during a scanning operation, a second carriage mounted on said first carriage for movement therewith and for movement independently of said first carriage in opposite directions transverse to the direction of movement of said first carriage upon which second carriage the piece under test and the monitor are mounted, and means for moving said carriages to cause the beam to traverse a scanning pattern with relation to said piece under test and the monitor including an electric motor for driving said first carriage, a second electric motor for driving the second carriage, connected circuits for said motor, a manually controlled switch for producing a reversal of the direction of the current through the first motor, and an automatically controlled switch for producing a reversal of the direction of the current through the second motor.

13. An apparatus for gauging the dimensions of an object of irregular contour comprising a source of penetrating radiations, means for directing a beam of said radiations from said source in a predetermined path, a detector located in the path of said beam, means for supporting a piece under test and a monitor in predetermined opposed relation for the passage of the beam simultaneously therethrough, the dimension of the monitor at each point therein in the direction of the line of the beam added to the dimension of the object at each opposed point in said direction being always equal to a constant sum if the dimensions of the object are correct, said supporting means including a carriage mounted for continuous movement in one direction during a scanning operation, a second carriage mounted on said first carriage for movement independently of said first carriage in opposite directions transverse to the direction of movement of said first carriage upon which second carriage the piece under test and the monitor are mounted, and means for moving said carriages to cause the beam to traverse a scanning pattern with relation to said piece under test and the monitor including an electric motor for driving said first carriage, a second electric motor for driving the second carriage, a common circuit for said motors, conductors for connecting the motors with said circuit, a manually operable switch for closing said circuit to energize the motors to start a scanning operation, an automatic switch mechanism connected with said circuit, and means for operating said switch mechanism to break the circuit to de-energize the motors and discontinue a scanning operation when the first carriage reaches a point adjacent the end of its movement in each direction.

14. An apparatus for gauging the dimensions of an object of irregular contour comprising, a source of penetrating radiations, means for directing a beam of said radiations in a predetermined substantially horizontal path, a detector located in the path of said beam, means for supporting a piece of irregular contour in the path of said beam in a position for the gauging of predetermined dimensions of said piece in the direction of the line of the beam, and a monitor supported in the path of said beam in a predetermined opposed position with relation to the object, the dimension of the monitor at each point therein in the direction of the line of the beam added to the dimension of the object at each opposed point in said direction being always equal to a constant sum if the dimensions of the object are correct, the apparatus having provision for adjustment to adjust the angle, about a vertical axis, at which the beam passes through the piece.

15. A method of gauging the dimensions of an object of irregular contour formed with a portion having irregularly varying dimensions in a predetermined direction comprising producing a monitor provided with a portion so formed that when the monitor is placed in a predetermined position with relation to the object with said portion of the monitor in predetermined opposed relation to said portion of the object, the sum of the dimension of the said portion of the object at each point therein in said direction added to the dimension in the same direction of said portion of the monitor at an opposed point therein is always equal to a constant if the object is a perfect object, and passing a beam of penetrative radiations through said object and said monitor in said direction to gauge the combined dimensions of the object and the monitor.

16. A method of gauging the dimensions of an object of irregular contour formed with a portion having irregularly varying dimensions in a predetermined direction comprising producing a monitor provided with a portion so formed that when the monitor is placed in a predetermined position with relation to the object with said portion of the monitor in predetermined opposed relation to said portion of the object, the sum of the dimension of the said portion of the object at each point therein in said direction added to the dimension in the same direction of said portion of the monitor at an opposed point therein is always equal to a constant if the object is a perfect object, and passing a beam of penetrative radiations through said object and said monitor in said direction at a plurality of points to gauge the combined dimensions of the object and the monitor at each of said points.

17. A method of gauging the dimensions of an object of irregular contour formed with a portion having irregularly varying dimensions in a predetermined direction comprising producing a monitor provided with a portion so formed that when the monitor is placed in a predetermined position with relation to the object with said portion of the monitor in predetermined opposed relation to said portion of the object, the sum of the dimension of the said portion of the object at each point therein in said direction added to the dimension in the same direction of said portion of the monitor at an opposed point therein is always equal to a constant if the object is a perfect object, passing a beam of penetrative radiations through said object and said monitor in said direction at a plurality of points to gauge the combined dimensions of the object and the monitor at each of said points and indicating the extent of the unabsorbed radiations at each point.

References Cited in the file of this patent
UNITED STATES PATENTS

| | | |
|---|---|---|
| 2,485,355 | Brennan | Oct. 18, 1949 |
| 2,582,981 | Fua | Jan. 22, 1952 |
| 2,645,971 | Herbst | July 21, 1953 |